Patented Feb. 3, 1925.

1,524,882

UNITED STATES PATENT OFFICE.

RURIC C. ROARK, OF BALTIMORE, MARYLAND.

INSECTICIDE.

No Drawing. Application filed August 6, 1923. Serial No. 655,955.

*To all whom it may concern:*

Be it known that I, RURIC C. ROARK, a citizen of the United States of America, and resident of Baltimore, Baltimore city, State of Maryland, have invented certain new and useful Improvements in and Relating to Insecticides, of which the following is a specification.

This invention relates to arsenical insecticides; and the objects and nature of the invention will be readily understood by those skilled in the art in the light of the following explanation of examples from among others within the spirit and scope of my discovery and invention.

An object of the invention is to produce an arsenical insecticide that will overcome certain disadvantages inherent in insecticides of the arsenical class heretofore proposed, and that will not be destructive to growing vegetation yet will be efficient in the control of chewing insects that infest such vegetation.

A great many arsenical compounds have been used in the past for the control of chewing insects, but none has given entire satisfaction. Some of the compounds employed are the arsenates of lead, calcium, iron, zinc and magnesium; the arsenites of calcium, zinc, copper and sodium; arsenic trioxide; arsenic disulfide and arsenic trisulfide. The arsenic compounds which are soluble in water, e. g., sodium arsenite, are not used on vegetation because vegetation is injured by soluble arsenic. Even the relatively insoluble compounds of arsenic, such as the arsenates of lead and calcium are sufficiently soluble in water to prove injurious to delicate foliage such as the leaves of the peach tree. There is therefore a need for an arsenic compound which is even less soluble in water than lead or calcium arsenate and at the same time is sufficiently soluble in the stomach and intestinal juices of the insect to poison it when ingested.

I have discovered that the arsenic compounds known as arsenide-sulphides when finely powdered are poisonous to chewing insects and are not injurious to the foliage of the peach tree. My invention involves an insecticide the essential ingredient of which is formed by an arsenide-sulphide.

I prefer to use the arsenide-sulphides occurring in nature, more especially the arsenide-sulphides of iron, nickel and cobalt. The formulæ and arsenic content of these compounds are as follows:

Iron arsenide-sulphide or arsenopyrite $FeAs_2.FeS_2As$, 46.03%.

Nickel arsenide-sulphide or gersdorffite $NiAs_2.NiS_2As$, 45.24%.

Cobalt arsenide-sulphide or cobaltite $CoAs_2.COS_2As$, 45.16%.

These compounds are greatly superior to all arsenical compounds heretofore employed as insecticides in that they may safely be employed upon the most delicate foliage without the addition of hydrated lime to the spray solution to reduce the soluble arsenic. Furthermore, these arsenide-sulphides can be produced in finely powdered form ready for use as insecticides at very much less cost than that of the manufacture of lead or calcium arsenate, or any of the other arsenical insecticides. The high price of white arsenic in recent years has made the cost of lead and calcium arsenate so great that their use has been restricted. In many instances, as in the case of the cotton grower, this has resulted in the loss of a large portion of the crop through failure to use any insecticide whatever. My invention supplies arsenic in a form in which it is poisonous to insects swallowing it with their food; in which it is not injurious to the most delicate vegetation; and at a price much less than other arsenical insecticides can be supplied for.

The preferred arsenide-sulphide that I employ is that of iron in its native state as the mineral arsenopyrite. While I prefer to use arsenopyrite in pure form, this is not essential to its successful use as an insecticide. The mineral may be pulverized together with the rock or ore with which it is associated, and the resulting powder used directly as an insecticide, either as a dust or as a spray.

These arsenide-sulphides contain 45 to 46 per cent metallic arsenic (As) as compared to 19.56% in standard lead arsenate and 26.08% in calcium arsenate of the grade used in cotton dusting. It is thus seen that the same dosage of arsenic may be obtained with a smaller quantity of arsenide sulphide than of the commonly used arsenicals, lead and calcium arsenates.

For use as an insecticide an arsenide-sulphide, for example iron arsenide-sulphide or arsenopyrite, is prepared by crushing to convenient size and then pulverizing in a Raymond, Fuller-Lehigh, or similar mill. I prefer to use a powder of such fineness that not less than 90% passes a 200 mesh test sieve. With regard to the fineness of the power, in general the finer the powder the quicker and more complete the insecticidal action. A powder which will just pass a 80 or 100 mesh sieve is effective, but a powder which passes a 200 mesh sieve is very much more effective. It is very difficult to get a powder 100% of which will pass a 200 mesh sieve, but it is possible and practical to obtain one 90% of which will pass a 200 mesh sieve, the other 10% being fine enough to pass a 100 mesh sieve.

The pulverized arsenopyrite may be employed exactly as other arsenical insecticides. It may be applied by dusting or spraying. It may be mixed with powdered sulphur to form a dusting material, or it may be mixed with Bordeaux, nicotine solution, etc., to form a combination spray. In all cases the dosage is based on the content of metallic arsenic (As), which percentage or content appears on the package or container or is otherwise made known to the user.

The pulverized arsenide-sulphides of nickel and cobalt, or the ore or rock containing them may be prepared and used in an identical manner as that described for iron arsenide-sulphide.

What I claim is:

1. An insecticide containing one or more of the arsenide-sulphides of metals of the iron group reduced to a powdered form of a fineness suitable for dusting or spraying purposes.

2. An insecticide containing one or more of the arsenide-sulphides of metals of the iron group reduced to a powdered form of a fineness so that approximately 90 per cent will pass through a substantially 100 mesh test sieve.

RURIC C. ROARK.